United States Patent [19]

Yasuhiro et al.

[11] 4,050,429
[45] Sept. 27, 1977

[54] EXHAUST GAS RECIRCULATION SYSTEM FOR AN AUTOMOBILE ENGINE, INCLUDING A HIGH ALTITUDE COMPENSATOR

[75] Inventors: Ikuta Yasuhiro; Shimo Hitomi, both of Toyoda, Japan

[73] Assignee: Toyota Jidosha Kogyo Kabushiki Kaisha, Toyoda, Japan

[21] Appl. No.: 689,541

[22] Filed: May 24, 1976

[30] Foreign Application Priority Data

Feb. 17, 1976 Japan .................................... 51-16851

[51] Int. Cl.$^2$ ............................................ F02B 33/00
[52] U.S. Cl. .................................... 123/119 A; 60/304
[58] Field of Search ...................... 123/119 A; 60/304

[56] References Cited

U.S. PATENT DOCUMENTS

| | | | |
|---|---|---|---|
| 3,791,144 | 2/1974 | Lang | 60/304 X |
| 3,915,136 | 10/1975 | Caldwell | 123/119 A |

*Primary Examiner*—Alan Cohan
*Attorney, Agent, or Firm*—Stevens, Davis, Miller & Mosher

[57] ABSTRACT

Disclosed is an exhaust gas recirculation system for an automobile engine, provided with a high altitude compensator. The high altitude compensator has an atmospheric chamber in which a first valve is adapted to open when the automobile reaches a predetermined altitude. The opening of this valve is enlarged in proportion to an increase in the altitude. The system also includes a second valve for exhaust gas recirculation control having a negative pressure chamber communicated with a first pressure sensing port opening to the carburetor. This valve controls the amount of the exhaust gas recycled into the intake side of the engine according to variation in the pressure of the negative pressure chamber. The system further includes a third or air flow switching valve having a negative pressure chamber communicated with a second pressure sensing port opening to the carburetor. This valve controls the amount of the air supplied into the exhaust side of the engine according to variation in the pressure of the negative pressure chamber. The atmospheric pressure chamber of the high altitude compensator is connected with both the negative pressure chambers of the second and third valves. The present system prevents a large decline in the engine power output, an unduly heavy generation of NO$_x$ and uncombusted HC and CO and thermal damage to the exhaust circuit of the engine during engine operation at a high altitude.

8 Claims, 1 Drawing Figure

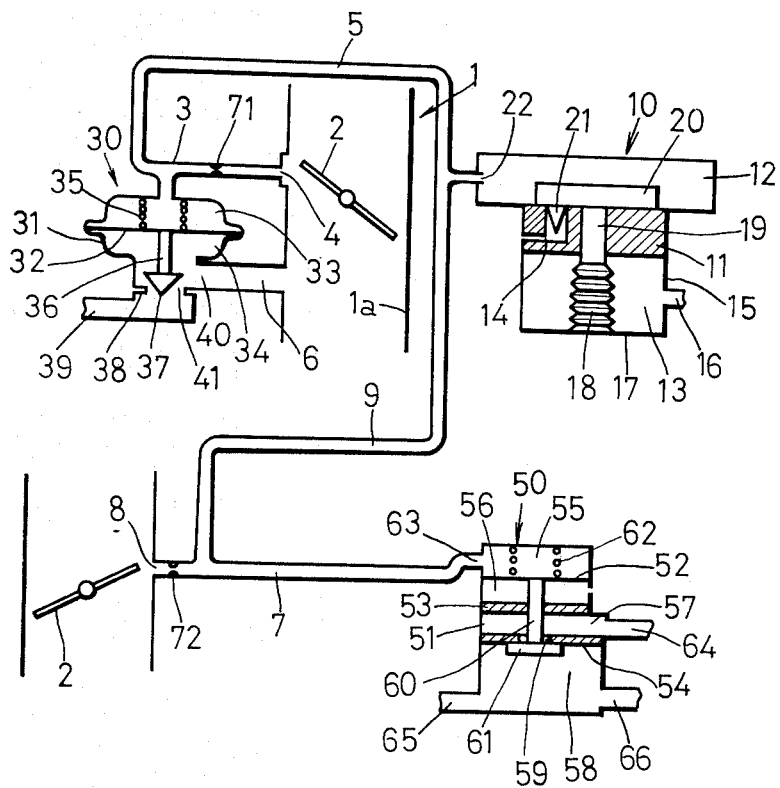

EXHAUST GAS RECIRCULATION SYSTEM FOR AN AUTOMOBILE ENGINE, INCLUDING A HIGH ALTITUDE COMPENSATOR

This invention relates to an exhaust gas recirculation system for an automobile internal combustion engine and more particularly, to such a system provided with a high altitude compensator.

With an increase in altitude, a gasoline engine for an automobile or the like is supplied with a richer fuel-air mixture because of a decline in the air density. This enrichment lowers the temperature of combustion products in the engine. The lowered temperature results in reduction of the amount of nitrogen oxide ($NO_x$). But it disadvantageously causes a decrease in the power output of the engine and an increase in unburnt hydrocarbon (HC) and carbon monoxide (CO), and a larger fuel consumption is required when operating at a high altitude. The engine is usually provided with an exhaust gas recirculating system, i.e., a system for recycling a part of the exhaust gas into the intake side for lowering the temperature of the combustion products to reduce the amount of $NO_x$ generation where operating at or near sea level. Consequently, when an automobile with such a system runs on higher land the temperature of the combustion products in the engine cylinders becomes unduly low due to the combined effect of the enriched fuel-air mixture and the exhaust gas recirculation. Thus, though the generation of $NO_x$ is satisfactorily reduced, there occur such inconveniences as a steep decline in the power output of the engine, deterioration of the driving characteristics and a great increase of the amount of the unburnt HC and CO exhausted.

It is an object of this invention to provide for an automobile engine an exhaust gas recirculation system which ensures a smaller decline in the power output of the engine and a smaller fuel consumption during its operation at a high altitude.

It is another object of this invention to provide an exhaust gas recirculation system which can restrain the generation of $NO_x$ and unburnt HC and CO within the maximum allowable level during engine operation at a high altitude.

It is a further object of this invention to provide a high altitude compensator, a valve for controlling exhaust gas recirculation and an air flow switching valve in combination with an exhaust gas recirculation system for an automobile engine, which cooperate to minimize the decline in the engine output, the fuel consumption and the generation of uncombusted hydrocarbons and carbon monoxide, as well as of nitrogen oxides, during engine operation at a high altitude.

This invention will be better understood from consideration of the following description and the accompanying drawing which schematically shows a preferred embodiment of this invention.

Referring to the drawing, there are schematically shown a carburetor 1 and a throttle valve 2 for an automobile engine. For convenience of illustration the carburetor and throttle valve have been shown twice. In actual practice the ports 4 and 8 would be on the same carburetor throat. A high altitude compensator 10 is divided into two atmospheric pressure chambers 12 and 13 with a thick partition 11 therebetween. An air admission port 14 which is axially L-shaped and has a circular cross section is provided in the partition 11, which communicates the upper atmospheric pressure chamber 12 with the open air. An air admission port 16 is provided in the side wall 15 of the lower atmospheric pressure chamber 13 and a bellows 18, which is able to expand and contract against the partition 11, is fitted in the center of the bottom wall 17 of the lower atmospheric pressure chamber 13. The bellows 18 is fluidally separated from the atmospheric pressure chamber 13 and is provided on the upper end thereof with a guide bar 19 slidably extending through the partition 11. An arm 20 is provided on the upper end of the guide bar 19 to form a T shape with the guide bar 19 and confined in the upper atmospheric pressure chamber 12. A conical valve member 21 projects downward from the inferior surface of the arm 20, and is slidable in the air admission port 14. The bellows 18 is evacuated and has a vacuum degree determined by a predetermined altitude at which the bellows 18 begins expansion. The air admission port 14 is closed by the valve member 21 until the automobile reaches the predetermined altitude, whereupon the valve 21 begins to open the air admission port 14. As the altitude increases, the bellows 18 further expands for making the clearance between the valve member 21 and the air admission port 14 wider gradually to increase the amount of air flowing into the atmospheric pressure chamber 12. An air exhaust port 22 is provided in the side wall of the upper atmospheric pressure chamber 12.

A control valve 30 for recirculation of exhaust gas comprises a housing 31 the interior of which is divided into a negative pressure chamber 33 and an exhaust gas chamber 34 by an airtight diaphragm 32 and a compression spring 35 is confined in the negative pressure chamber 33. A valve rod 36 extending through the exhaust gas chamber 34 is fixed to the diaphragm 32 and a conical valve member 37 is fitted on the lower end of the rod 36. A valve seat 38 for the valve member 37 is provided at the lower end of the housing 31. An exhaust gas admission port 39 is communicated with the exhaust system of the engine. An exhaust gas outlet port 40 is communicated with an engine intake manifold 1a. A circular valve port 41 is defined by the valve seat 38. The valve member 37 is movable to and away from the valve seat 38 by shifting of the diaphragm 32 to control the size of the clearance defined between the valve member 37 and the valve seat 38 so that the amount of the exhaust gas passing through the valve port 41 into the intake manifold 1a is controlled.

The drawing further shows an air flow switching valve 50. The valve 50 comprises a housing 51 in which a diaphragm 52 is provided to separate a negative pressure chamber 55 from the remaining interior space of the valve 50. The remaining interior space of the valve 50 is divided into an atmospheric pressure chamber 56, a by-pass chamber 57 and a positive pressure chamber 58 by two partitions 53 and 54. A valve port 59 is defined in the center of the lower partition 54. A valve rod 60 extends through the upper partition 53 slidably but air-tightly, and further extends through the valve port 59 in the lower partition 54. A disk-like valve member 61 is fixed to the lower end of the rod 60 of which the upper end is fitted in the center of the inferior surface of the diaphragm 52. A compression spring 62 is confined in the negative pressure chamber 55, the side wall of which is provided with an air admission port 63. An air exhaust port 64 is provided in the side wall of the bypass chamber 57. The positive pressure chamber 58 is provided with an air admission port 65 adapted for admitting air from an air injection pump (not shown)

and an air exhaust port 66 through which the air is delivered into the exhaust system of the engine.

The negative pressure chamber 33 of the valve 30 is communicated with a sensing port 4 in the wall of the carburetor 1 through a passage 3 which is communicated with the air exhaust port 22 of the atmospheric pressure chamber 12 of the high altitude compensator 10 through a passage 5. The exhaust gas outlet port 40 is connected with the intake manifold 1a downstream of the throttle valve 2 through a passage 6. The negative pressure chamber 55 of the valve 50 is communicated through a passage 7 with a negative pressure port 8 in the vicinity of the throttle valve 2. The passages 5 and 7 are connected with each other through a passage 9. A pair of venturi throats 71 and 72 are provided in the passages 3 and 7, respectively.

While the automobile is running on lower land below a predetermined altitude, the valve 21 of the high altitude compensator 10 keeps the air admission port 14 closed for interrupting the supply of air into the negative pressure chamber 33 of the valve 30. Accordingly, the negative pressure existing at the sensing port 4 of the carburetor 1 extends into the negative pressure chamber 33, whereby the diaphragm 32 is moved upward to lift the valve member 37 from its seat 38 to open the port 41. Exhaust gas flows through the valve port 41 and the passage 6 into the intake manifold 1a at a rate controlled by the lift of the valve member 37 above its seat 38. The temperature of the combustion products in the engine cylinders is, therefore, lowered and the amount of $NO_x$ is reduced. While the valve 21 of the high altitude compensator 10 keeps the air admission port 14 closed, no air is supplied into the negative pressure chamber 55 of the valve 50, either. Then, the negative pressure existing at the negative pressure port 8 of the carburetor 1 reaches into the negative pressure chamber 55 to cause the valve member 61 to close the valve port 59 so that the entire quantity of the air delivered from the air injection pump (not shown) and entering the positive pressure chamber 58 through the air admission port 65 flows out through the air exhaust port 66 into the exhaust system of the engine to burn the unburnt HC and CO in the exhaust gas for reducing the amount of HC and CO exhausted to the atmosphere.

When the automobile reaches the predetermined altitude, the bellows 18 of the high altitude compensator 10 begins to expand due to a decline in the ambient pressure and raises the valve 21 for permitting an inflow of air into the atmospheric pressure chamber 12 through the air admission port 14. The air inflow increases in accordance with an increase in the altitude and consequently, further upward movement of the valve 21.

Then, air is supplied into the negative pressure drawbar 33 of the valve 30 so that the pressure within the negative pressure chamber 33 becomes higher than the pressure existing at the sensing port 4. The diaphragm 32 is, therefore, pushed downward to reduce the opening of the valve port 41 and consequently the amount of the exhaust gas flowing through the valve 30. As the altitude of the land increases the density of the air is rarefied, but the inflow of the air into the atmospheric pressure chamber 12 increases because the opening of the valve 21 of the high altitude compensator 10 becomes wider, so that the pressure within the negative pressure chamber 33 of the valve 30 gradually increases. As the automobile reaches a higher altitude, therefore, the valve member 37 of the valve 30 is further moved down to reduce the amount of the exhaust gas recycling into the intake manifold 1a. As the altitude increases the fuel-air mixture becomes richer with a naturally resultant reduction in the amount of $NO_x$ generated. It is no longer necessary to recycle a large amount of exhaust gas into the intake manifold 1a for reducing $NO_x$, but any such further exhaust gas recirculation will cause an undue lowering in the power output of the engine. Consequently the combination of the high altitude compensator 10 and the valve 30 according to this invention functions to regulate an excessive exhaust gas recirculation on land of high altitude. The throttle 71 provided within the passage 3 functions to restrain the inflow of the air into the carburetor 1 from the high altitude compensator 10 through the sensing port 4 as well as to control the negative pressure reaching into the valve 30 through the sensing port 4.

When the valve 21 of the high altitude compensator 10 is open, a part of the air flowing into the atmospheric pressure chamber 12 is also supplied into the negative pressure chamber 55 of the valve 50 through the air exhaust port 22 of the high altitude compensator 10 and the passages 9 and 7, while a minor amount of air also flows into the carburetor 1 through the negative port 8. Due to the air flow into the negative pressure chamber 55 the pressure therein becomes higher than at the negative pressure port 8. Accordingly, the diaphragm 52 is pushed downward to open a clearance between the valve member 61 and the partition 54 and a part of the air from the air injection pump is by-passed through the port 59 into the by-pass chamber 57. The air thus by-passed through may be supplied to the air cleaner on the intake side of the engine or discharged into the atmosphere, whereby the amount of the air supplied to the exhaust system is reduced. In accordance with an increase in the altitude, the amount of the air entering the atmospheric pressure chamber 12 of the high altitude compensator 10 increases to thereby raise the pressure of the negative pressure chamber 55 of the valve 50 and increase the air flow into the carburetor 1 through the negative pressure port 8. Due to the increase in the pressure of the negative pressure chamber 55, the valve member 61 further moves down to enlarge the clearance between the valve member 61 and the partition 54 and increase the amount of the air flowing into the by-pass chamber 57. The air supplied through the valve 50 into the exhaust circuit is, therefore, reduced in accordance with the increase of the altitude, while the amount of the air supplied into the carburetor 1 from the high altitude compensator 10 is increased. With the increase of the altitude the fuel-air mixture supplied into a conventional engine becomes denser and the unburnt HC and CO in the exhaust gas increase. Introduction of a sufficient amount of air to burn such HC and CO has often caused overheating of the exhaust system of the engine to the extent that the oxidizing catalyst is burned out. The combination of the high altitude compensator 10 and the air flow switching valve 50 according to this invention very advantageously serves to rarefy the fuel-air mixture and reduce the amount of the air supplied into the exhaust system in proportion to the increase of the altitude. The throttle 72 provided in the passage 7 controls appropriately the amount of the air flowing into the carburetor 1 from the high altitude compensator 10 through the negative pressure port 8.

What is claimed is:

1. In an exhaust gas recirculation system for an automobile engine, the improvement comprising:

a first valve having a first atomspheric pressure chamber having means to receive an increasing air flow therethrough in proportion to an increase of the altitude;

a second valve having a negative pressure chamber communicating with a first pressure sensing port opening to a carburetor, said second valve having means to control the amount of exhaust gas recycled into an intake manifold according to variation in the pressure of said negative pressure chamber; and a third valve having a negative pressure chamber communicating with a second pressure sensing port opening to said carburetor, said third valve having means to control the amount of air supplied into the exhaust side of said engine according to variation in the pressure of said negative pressure chamber of said third valve, wherein said atmospheric pressure chamber of said first valve is connected with both said negative pressure chambers of said second and third valves.

2. The exhaust gas recirculation system as set forth in claim 1, wherein said first valve comprises:
said first atmospheric pressure chamber;
a second atmospheric pressure chamber separated from said first atmospheric pressure chamber by a partition;
said partition having an air port for introducing the ambient air into said first atmospheric pressure chamber; and
a valve member adapted to close said air port while said altitude is lower than a predetermined level and open said air port to permit an inflow of said ambient air into said first atmospheric pressure chamber at said predetermined level of said altitude.

3. The exhaust gas recirculation system as set forth in claim 2, wherein said first valve further comprises:
a bellows provided in said second atmospheric pressure chamber and adapted to begin expansion at said predetermined level of said altitude;
a valve rod secured at one end to one end of said bellows and extending through said partition slidably but airtightly; and
an arm mounted on the other end of said valve rod, said valve member being secured to said arm and closing said air port while said altitude is below said predetermined altitude, said valve member being adapted for gradual movement out of said air port with said expansion of said bellows to gradually increase said inflow upon said increase of said altitude to and above said predetermined level.

4. The exhaust gas recirculation system as set forth in claim 1, wherein said second valve comprises:
a housing;
a diaphragm provided in said housing;
said negative pressure chamber;
an exhaust gas chamber separated from said negative pressure chamber by said diaphragm, and having two ports communicating with said exhaust side and said intake manifold, respectively;
a valve member fitted to said diaphragm and provided in said exhaust gas chamber;
a compression spring provided in said negative pressure chamber to urge said diaphragm downwardly; and
a valve seat interposed between said two ports of said exhaust gas chamber defining a valve port adapted to be opened and closed with movement of said valve member.

5. The exhaust gas recirculation system as set forth in claim 4, wherein said valve member is conial and said valve seat is circular, whereby a clearance through said valve port gradually changes with said movement of said valve member.

6. The exhaust gas recirculation system as set forth in claim 1, wherein said third valve comprises:
a housing;
a diaphragm in said housing;
said negative pressure chamber;
an atmospheric pressure chamber separated from said negative pressure chamber by said diaphragm;
a first partition in said housing;
a by-pass chamber separated from said atmospheric pressure chamber by said first partition and having an air by-pass port;
a second partition in said housing and having a valve port in the center;
a positive pressure chamber separated from said by-pass chamber by said second partition;
a valve rod secured to said diaphragm at one end and extending through said first partition slidably but airtightly, said valve rod having an opposite end extending through said valve port and having a smaller diameter than said valve port;
a valve member secured to said opposite end of said valve rod and adapted to open and close said valve port; and
a compression spring provided in said negative pressure chamber to urge said diaphragm downwardly;
said positive pressure chamber having a pair of ports communicating with a source of pressurized air supply and said exhaust side of the engine, respectively.

7. The exhaust gas recirculation system as set forth in claim 1, wherein a venturi throat is provided in a passage connecting said negative pressure chamber of said second valve and said first pressure sensing port and said atmospheric pressure chamber of said first valve is communicated with a passage extending between said venturi throat and said negative pressure chamber of said second valve.

8. The exhaust gas recirculation system as set forth in claim 1, wherein a venturi throat is provided in a passage connecting said negative pressure chamber of said third valve and said second pressure sensing port and said atmospheric pressure chamber of said first valve is communicated with a passage extending between said venturi throat and said negative pressure chamber of said third valve.

* * * * *

UNITED STATES PATENT OFFICE
CERTIFICATE OF CORRECTION

Patent No. 4,050,429　　　　　　　　Dated September 27, 1977

Inventor(s) Yasuhiro IKUTA; Hiromi SHIMO

It is certified that error appears in the above-identified patent and that said Letters Patent are hereby corrected as shown below:

In the inventors' names:

"Hitomi" should be spelled --Hiromi--;

Both inventors' names were transposed in the patent:

"Ikuta YASUHIRO; Shimo HITOMI" should read

--Yasuhiro IKUTA; Hiromi SHIMO--;

Column 3, lines 53-54, change "drawbar" to --chamber--.

Signed and Sealed this

Twenty-first Day of March 1978

[SEAL]

Attest:

RUTH C. MASON　　　　　　　　LUTRELLE F. PARKER
Attesting Officer　　　　　Acting Commissioner of Patents and Trademarks